Jan. 15, 1952  R. C. MURRAY  2,582,715
CURING TUBE
Filed May 10, 1949
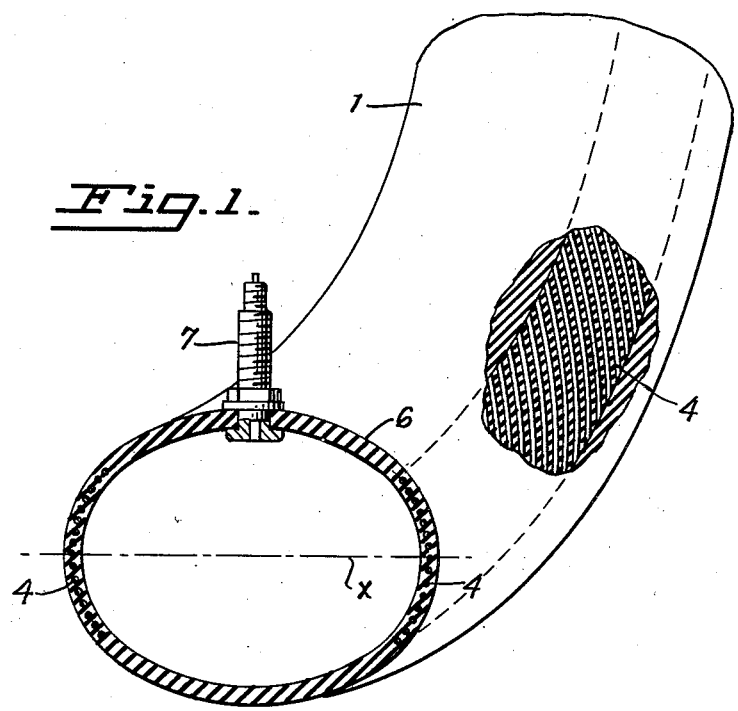
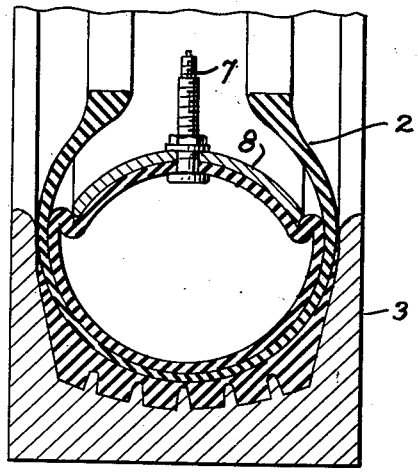
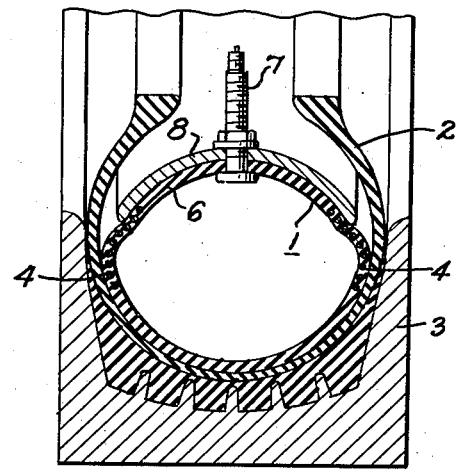
INVENTOR.
ROBERT C. MURRAY
BY George B White
ATTORNEY Patented Jan. 15, 1952

2,582,715

UNITED STATES PATENT OFFICE 2,582,715

CURING TUBE

Robert C. Murray, Dallas, Tex., assignor to Rubber & Tire Materials Company, Dallas, Tex., a partnership Application May 10, 1949, Serial No. 92,319

7 Claims. (Cl. 18—45)

This invention relates to a curing tube.

Curing tubes are used to hold tires inflated in tire curing molds. The type of curing tubes used in the past were either of circular cross section, or some of oval cross section with the major axis radial. Consequently such tubes stretched sidewise excessively as compared with outward stretching against the tire periphery. The uneven side stretching caused so called crimping over and locking at the edges of the curing rim, on which latter such curing tubes are mounted within a tire casing to be cured. This crimping over and locking causes excessive localized stress at the sides of the curing tube, resulting in progressive thinning out of the sidewalls and rapid break down. The most frequent failure areas of curing tubes are the opposite sides where the tube crimps over the edges of the curing rim. Such failure is accelerated by the need of gradual and slow inflation of such tubes in order to reduce the danger of crimping over.

An object of my invention is to provide a curing tube in which crimp and stress areas on the sidewalls of the curing tube are bridged by a reinforcing material adapted to retard lateral stretching of the tube and equalize the stretch of tube under inflation in all directions, thus obviating crimping over and locking at the rim edges.

Another object of the invention is to provide a curing tube which is preshaped to a transversely oval or elliptical cross section, substantially the same shape that a tube must assume in recapping or retreading mold on an inside rim, but it is reinforced at its side edges, at the areas where the curing rim edges contact the tube, thus eliminating excessive sidewise stretching, thin spots, porosity, overgrowth and premature failures.

I am aware that some changes may be made in the general arrangements and combinations of the several devices and parts, as well as in the details of the construction thereof without departing from the scope of the present invention as set forth in the following specification, and as defined in the following claims; hence I do not limit my invention to the exact arrangements and combinations of the said device and parts as described in the said specification, nor do I confine myself to the exact details of the construction of the said parts as illustrated in the accompanying drawings.

With the foregoing and other objects in view, which will be made manifest in the following detailed description, reference is had to the accompanying drawings for the illustrative embodiment of the invention, wherein:

Fig. 1 is a fragmental sectional perspective view of a curing tube constructed in accordance with my invention.

Fig. 2 is a sectional somewhat diagrammatic illustration of the crimping of previous curing tubes.

Fig. 3 is a sectional view of my curing tube in a tire and mold.

My curing tube 1 is formed into a usual ring to fit within a tire casing 2, in a vulcanizer matrix or mold 3. The cross sectional shape of the tube 1 is oval or elliptical transversely with respect to the ring. In other words the major axis X of the cross sectional ellipse shape is generally transverse to the tube and at right angles to the central diametrical plane of the tube.

The side edges or opposite side areas of the tube are reinforced by a stretch resisting layer 4 integrally united in the rubber material 6 of the tube. The reinforcing layer 4 at each side extends equal distance to both sides of the major axis X, and all around the respective sides of the tube 1. The reinforcing layer 5, in the present illustration is a strip of cord, cut so that the strands of the cord are at acute angle to the direction of pull tending to stretch the tube. The tube usually stretches radially outwardly and circumferentially outwardly to increase its diameter under inflation. The arrangement of the longitudinally resiliently yieldable strands of the strip at acute angles to the directions of these stretching forces allows the reinforcing strip to shift or move somewhat with tube expansion generally radially, without pulling loose from the surrounding rubber body of the tube, and thus protecting the tube from the rim edge.

A valve 7 is provided in the tube 1. The valve has an enlarged valve stem hole to permit rapid inflation.

The steps of preshaping and reinforcing a tube in accordance with my invention, include the forming of a tubular strip out of rubber, the storing of the tubular strip flat to preform opposite side edges for the correct symmetrical location of the reinforcing strips; applying a strip of reinforcing material over each side edge so that the strip extends equal distance to both sides of each edge; specifically, in the present illustration, applying a strip of cord cut on the bias, as said reinforcing strip, so that the strands of the cord are at an acute angle to the radial and circumferential pull exerted on the strip by the tube when inflated; covering this reinforcing strip by a rubber strip which overlaps beyond the reinforcing strip; joining the ends of a proper length of the tubular strip and securing at said joint an inflating valve; preshaping the assembled tube cold by mounting it on an inside curing rim of correct diameter and then partially inflating it and holding it in that position. Finally the preshaped tube under partial inflation is cured in a suitable matrix and mold.

In use my curing tube 1 is placed inside the tire casing 2 in a mold. Then an inside curing rim 8 is placed against the inner periphery of the curing tube 1. Then the tube 1 is rapidly inflated to press the tire casing against the mold, and is kept under pressure until the curing of the tire casing is completed. The rapid inflation and deflation saves production time, and prevents blemishes, faulty curing by reducing the time required for the beginning of the cure of a tire casing. Frequent tube failure and attendant curing damage and loss are eliminated, and great overall economy and safety in tire vulcanizing operations is accomplished.

I claim:

1. A curing tube of transversely elliptical cross section, the major axis of the ellipsis of said cross section being generally at right angles to the diametrical center plane of the tube and a reinforcing layer on the wall of the tube at each end of said major axis extending at substantially equal distance to both sides of said major axis and around the entire tube for equalizing the stretching of the tube.

2. A curing tube of transversely elliptical cross section, the major axis of the ellipsis of said cross section being generally at right angles to the diametrical center plane of the tube, and a reinforcing layer on the wall of the tube at each end of said major axis extending at substantially equal distance to both sides of said major axis and around the entire tube for equalizing the stretching of the tube, each of said reinforcing layers comprising a strip of material of higher tensile strength than that of the tube material and being integrally united with the tube material.

3. A curing tube preshaped to transversely elliptical cross section, the major axis of the ellipsis of said cross section being generally at right angles to the diametrical center plane of the tube, and reinforced areas on both sides of said tube at the ends of said major axis to direct stretching under inflation generally in radial directions.

4. A curing tube preshaped to transversely elliptical cross section, the major axis of the ellipsis of said cross section being generally at right angles to the diametrical center plane of the tube, and reinforced areas on both sides of said tube at the ends of said major axis to direct stretching under inflation generally in radial directions, and a tube valve adapted for rapid inflation of the tube.

5. A curing tube preshaped to transversely elliptical cross section, the major axis of the ellipsis of said cross section being generally at right angles to the diametrical center plane of the tube, and reinforced areas on both sides of said tube at the ends of said major axis to direct stretching under inflation generally in radial directions, said reinforced sides extending equal distance on both sides of the ends of said major axis.

6. A curing tube preshaped to transversely elliptical cross section, the major axis of the ellipsis of said cross section being generally at right angles to the diametrical center plane of the tube, and reinforced areas on both sides of said tube at the ends of said major axis to direct stretching under inflation generally in radial directions, said reinforced sides extending equal distance on both sides of the ends of said major axis, each of said reinforced sides comprising a strip of cord material vulcanized into the tube material at said areas.

7. A curing tube preshaped to transversely elliptical cross section, the major axis of the ellipsis of said cross section being generally at right angles to the diametrical center plane of the tube, and reinforced areas on both sides of said tube at the ends of said major axis to direct stretching under inflation generally in radial directions, said reinforced sides extending equal distance on both sides of the ends of said major axis, each of said reinforced sides comprising a strip of cord material vulcanized into the tube material at said areas, said strip of cord material being cut on the bias, the strands thereof extending at an acute angle to the radius and circumference of the tube.

ROBERT C. MURRAY.

REFERENCES CITED

The following references are of record in the file of this patent:

UNITED STATES PATENTS

| Number | Name | Date |
|---|---|---|
| Re. 16,142 | Burdette | Aug. 18, 1925 |
| 1,237,131 | Welch | Aug. 14, 1917 |
| 1,270,345 | Tew | June 25, 1918 |
| 1,319,088 | Johnson | Oct. 21, 1919 |
| 1,337,707 | Johnson et al. | Apr. 20, 1920 |
| 1,374,570 | Huetter | Apr. 12, 1921 |
| 1,428,508 | Waters | Sept. 5, 1922 |
| 1,699,600 | Mann | Jan. 22, 1929 |
| 1,998,897 | Kay | Apr. 23, 1935 |
| 2,193,899 | Casto et al. | Mar. 19, 1940 |
| 2,305,412 | Frolich et al. | Dec. 15, 1942 |
| 2,324,974 | Greenup | July 20, 1943 |
| 2,339,559 | Charnes | Jan. 18, 1944 |